P. F. HALFERTY.
SHOCK ABSORBER.
APPLICATION FILED JUNE 10, 1920.
1,392,150. Patented Sept. 27, 1921.
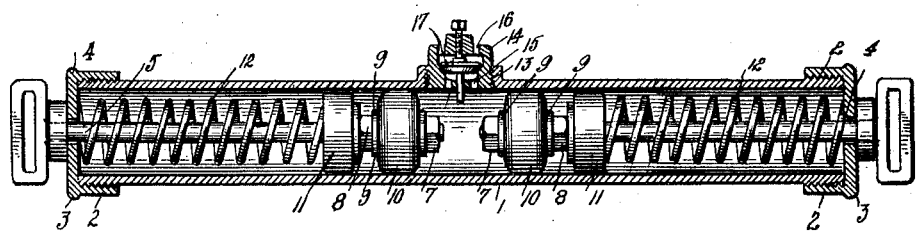
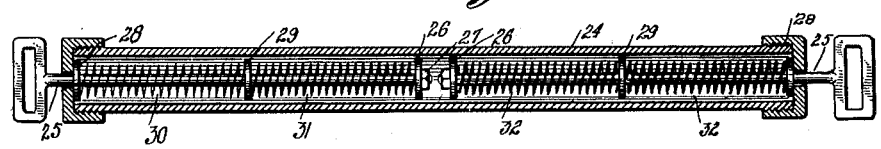
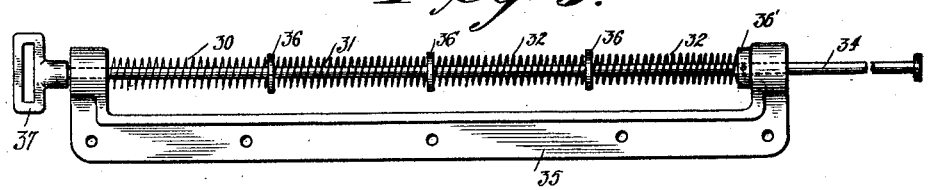
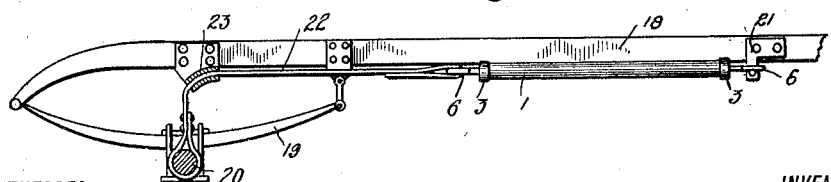
WITNESSES
H. C. Hebig
S. W. Foster
INVENTOR
P. F. HALFERTY
BY
Munn & Co.
ATTORNEYS

UNITED STATES PATENT OFFICE.

PETER F. HALFERTY, OF ABERDEEN, WASHINGTON.

SHOCK-ABSORBER.

1,392,150.   Specification of Letters Patent.   Patented Sept. 27, 1921.

Application filed June 10, 1920. Serial No. 387,917.

*To all whom it may concern:*

Be it known that I, PETER F. HALFERTY, a citizen of the United States, and a resident of Aberdeen, in the county of Grays Harbor and State of Washington, have invented a new and Improved Shock-Absorber, of which the following is a full, clear, and exact description.

This invention relates to improvements in shock absorbers, and more particularly to shock absorbers of the snubber type for use on automobiles and other similar vehicles, an object of the invention being to provide improved means for utilizing air pressure or partial vacuum and also spring pressure to absorb shocks and jars.

A further object is to provide a shock absorber which will be relatively small, which can be conveniently attached to the frame or chassis of an automobile, and which will most efficiently perform the functions for which it is intended.

With these and other objects in view the invention consists in certain novel features of construction, and combinations and arrangements of parts as will be more fully hereinafter described and pointed out in the claims.

In the accompanying drawings—

Figure 1 is a view in longitudinal section illustrating a preferred form of my improved shock absorber.

Fig. 2 is a similar view illustrating a modification.

Fig. 3 is a view in side elevation illustrating another modification.

Fig. 4 is a fragmentary view in side elevation illustrating my improved shock absorber in operative position on a vehicle.

1 represents the cylindrical casing of my improved shock absorber which is preferably provided with screw threaded ends 2 for the reception of internally screw threaded caps 3 closing the ends of the cylinder. These caps 3 are centrally perforated, as shown at 4, for the reception of rods 5, and loops 6 are provided on the outer ends of the rods for their attachment to the parts of the vehicle as will be hereinafter explained.

The inner ends of the rods 5 are screw threaded for the reception of nuts 7 and 8 with washers 9 located against the inner faces of the nuts and against the opposite sides of elastic pistons 10 which are preferably in the form of rubber balls perforated to receive the rod and expanded by the movement of the nuts 7 and 8 toward each other to form a tight or snug fit within the cylinder 1. The rods 5 also preferably support cylindrical pistons 11 guiding their movement in the cylinder and coiled springs 12 are located around the rods between the pistons 11 and the caps 3 to force the pistons inwardly.

The cylinder 1 is formed with a screw threaded central opening 13 in which a valve casing 14 is removably screwed. This valve casing 14 is provided with outlet ports 15 and 16 and a screw operated valve 17 which is opened during the assemblage of the parts and then tightly closed.

Referring particularly to Fig. 4, 18 represents the frame or chassis bar of an automobile or other vehicle supported at its forward end on a spring 19 located above an axle 20 and the casing 1 of my improved shock absorber is preferably located adjacent the bar 18 with a looped end 6 of one of the rods 5 fixedly engaging a bracket 21 on the bar 18. The loop 6 of the other rod is connected to a strap 22, and the latter is passed through a curved guide sleeve 23 and secured around the axle 20 so that the movement of the axle relative to the bar or frame 18 will cause a longitudinal movement of the strap 22, and hence, exert a pull on one of the rods 5 during the rebound of the frame caused by the spring 19 when the wheels of the vehicle encounter a depression or obstruction in the road. This longitudinal pull on the strap 22 will cause both of the rods 5 to be moved outwardly relative to the cylinder 1 and thus contract the springs 12. This movement will also cause the pistons 10 to move apart and cause a partial vacuum in the intermediate portion of the cylinder to resist such action. Hence, it will be noted that I utilize both the springs 12 as cushions and also the air resistance to absorb shocks. The inward movement of the pistons is facilitated by the check valve 17 which allows any excessive air pressure to be quickly reduced.

In the modification illustrated in Fig. 2, I employ a cylindrical casing 24 in which a pair of rods 25 are movable and support on the inner ends of these rods washers 26 held in place by nuts 27. The rods 25 each also support a pair of movable washers 28 and 29 and between the washers a series of coiled springs 30, 31, 32 and 33 are provided.

The spring 30 is the weakest of all of the springs and the springs 31, 32 and 33 are strongest or of greater thickness of metal in regular succession, so that the lighter or weaker spring 30 will absorb minor shocks and vibrations and increasing shocks and vibrations will be absorbed by the succession of stronger springs.

In Fig. 3 I illustrate another modification in which I utilize the same principle of a series of successively stronger springs 30, 31, 32 and 33, but dispense with the casing altogether and support a single rod 34 in a bracket 35 which is adapted to be fixedly connected to the vehicle frame. This rod 34 supports all of the springs and is provided with movable washers 36 between them and at one end is provided with an elbow 37 for attachment to the strap 22 as will be readily understood. A fixed collar 36' is secured on the rod to compel a compression of the springs when the rod is moved in one direction.

It will thus be noted that with the preferred form of my invention as illustrated in Fig. 1, I utilize both the air pressure or partial vacuum of the air as well as the springs to absorb shocks and jars and in the modifications illustrated in Figs. 2 and 3 I utilize the springs of varying strength or elasticity to take up the shocks to which the device is necessarily subjected.

Various other slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A shock absorber, comprising a cylindrical casing, rods movable in the ends of the casing, elastic pistons on the rods, nuts on the rods at opposite sides of the pistons adapted when moved toward and away from each other to adjust the diameter of the pistons, said pistons snugly fitting the casing, coiled springs on the rods between the ends of the casing and said pistons, and an outwardly opening manually operated valve controlling a port in the intermediate portion of the casing between the pistons.

2. A shock absorber, comprising a cylindrical casing, rods movable in the ends of the casing, elastic pistons on the rods, nuts on the rods at opposite sides of the pistons adapted when moved toward and away from each other to adjust the diameter of the pistons, said pistons snugly fitting the casing, coiled springs on the rods between the ends of the casing and said pistons, said casings having a screw threaded opening in its intermedaite portion, a valve casing removably screwed into said opening, said valve casing having outlets at its inner and outer ends, and an outwardly opening manually operated valve in said casing.

PETER F. HALFERTY.